Sept. 29, 1959  G. KLEMT  2,906,172
VARIFOCAL OBJECTIVE SYSTEM
Filed May 17, 1956  2 Sheets-Sheet 1

INVENTOR.
GÜNTER KLEMT
BY
Karl F. Ross
AGENT

Sept. 29, 1959 G. KLEMT 2,906,172
VARIFOCAL OBJECTIVE SYSTEM
Filed May 17, 1956 2 Sheets-Sheet 2

INVENTOR:
GÜNTER KLEMT
BY
AGENT

United States Patent Office 2,906,172
Patented Sept. 29, 1959

2,906,172

VARIFOCAL OBJECTIVE SYSTEM

Günter Klemt, Kreuznach, Rhineland, Germany, assignor to Jos. Schneider & Co., Optische Werke, Kreuznach, Rhineland, Germany, a German firm Application May 17, 1956, Serial No. 585,514

Claims priority, application Germany May 21, 1955

7 Claims. (Cl. 88—57)

My present invention relates to a varifocal objective system in which a displaceable lens member affords variations in focal length without objectable shifts of the image plane.

Varifocal systems of this description are known wherein the movable lens member forms part of a three-component attachment positioned in front of a principal objective of fixed focal length and position relative to the plane of a projection surface, such as a photographic film. The movable component of the attachment is disposed between the two other, fixed components which are of a refractivity opposite to that of the movable member. With such systems it has been possible to provide satisfactory correction of distortion with a focal-length ratio of about 1:3, given an aperture ratio of 1:2.8. Earlier attempts to increase the focal-length ratio substantially above 1:3 have failed because of the impractically large lens diameters that would be required.

It has already been proposed to subdivide the varifocal range into two zones for a variation of the focal length in two stages. This, however, has heretofore required a cumbersome readjustment of the entire system as well as a refocusing for infinity on passing from one zone to the other.

The general object of my present invention is to provide a two-stage varifocal system of large varifocal ratio wherein the transition from one zone to the other is carried out by a simple mechanical operation without the need for visual refocusing.

A more specific object of this invention is to provide a varifocal system of the character referred to which utilizes a three-component varifocal lens group whose two outer members are fixedly positioned for all focal-length ratios within both zones of the overall range.

The foregoing objects are realized, in accordance with this invention, by the provision of two interchangeable lens groups representing the principal objective, these two interchangeable groups having respective focal lengths $f'$, $f''$ whose ratio is $1:\sqrt{n}$, where $n$ is the desired varifocal ratio, and having substantially the same image distance measured from a fixed image plane to the front vertex of the most forwardly positioned member thereof. If, now, the varifocal group ahead of the principal objective is designed to provide an overall focal length ranging between $$f_1 = f\sqrt[4]{1/n} \text{ and } f_2 = f\sqrt[4]{n}$$

where $f$ is the focal length of the interchangeable group following it, and if we replace $f$ first by $f'$ and then by $f''$, we obtain two limiting values $$f_1' = f'\sqrt[4]{1/n} \text{ and } f_1'' = f'\sqrt[4]{n}$$

for the first zone as well as two limiting values $$f_2' = f''\sqrt[4]{1/n} = f'\sqrt[4]{n} \text{ and } f_2'' = f''\sqrt[4]{n} = f'\sqrt[4]{n^3}$$

whence $$f_1'' = f_2' \text{ and } f_2''/f_1' = n$$

thus affording variation over a range corresponding to the desired varifocal ratio. With this system, wherein the ratio of focal lengths obtainable by means of the varifocal group alone is given with $1:\sqrt{n}$, overall varifocal ratios well in excess of 1:3 can be realized.

The invention will be further described with reference to the accompanying drawing in which.

Figure 1:
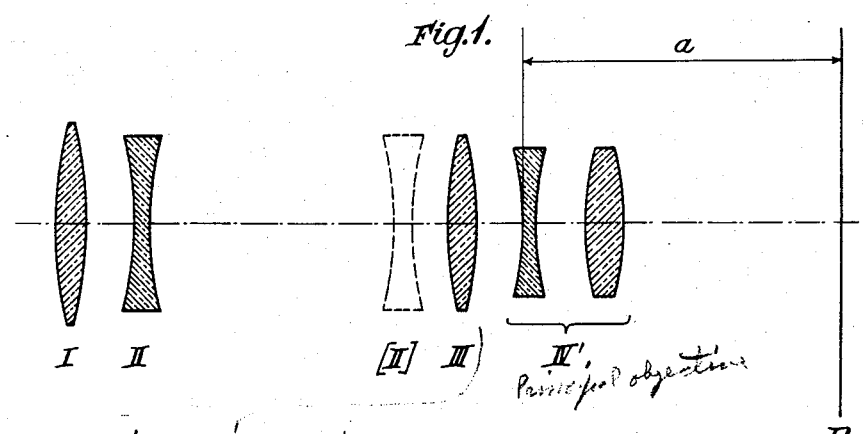
Fig. 1 is a diagrammatic view of an objective system according to the invention in a first position of adjustment.
Figure 2:
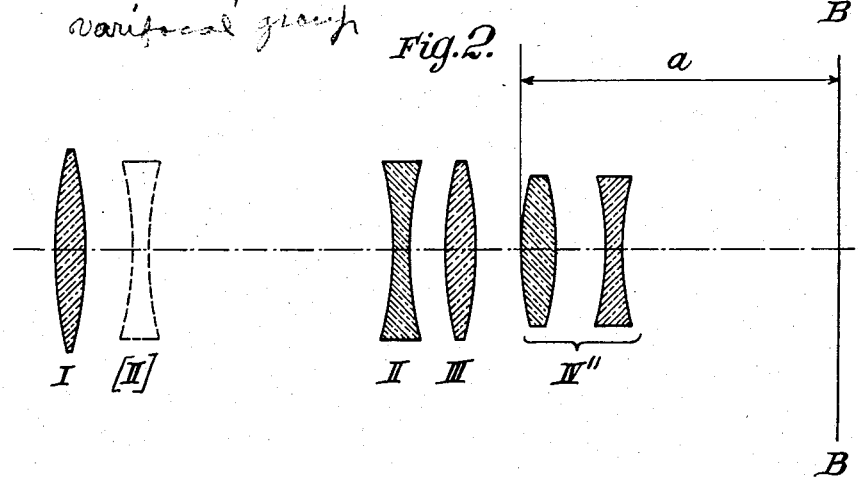
Fig. 2 is a view similar to Fig. 1 but showing the objective system in a second position of adjustment.

Figs. 1 and 2 show the three components I, II and III of a varifocal group preceding a principal objective with axially fixed components. Members I and III have been shown as positive lenses between which the negative lens member II is displaceable as indicated in full and dotted lines. The principal objective comprises two interchangeable lens groups IV' (Fig. 1) and IV" (Fig. 2) of different focal lengths $f'$, $f''$ as described above. It will be noted that the image distance $a$, measured between the image plane B and the forward vertex of the front component of group IV' or IV", is substantially the same in both Figs. 1 and 2. Any number of fixed supplemental lens members may, of course, be positioned between group IV' or IV" and image plane B.

Figure 3:
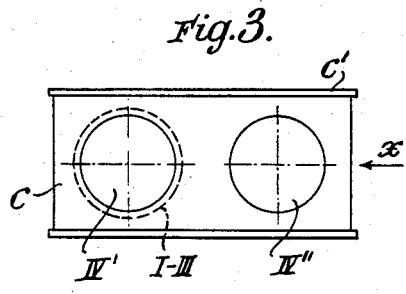
Fig. 3 shows a movable carriage for the interchangeable lens groups of the system of Figs. 1 and 2.
Figure 4:
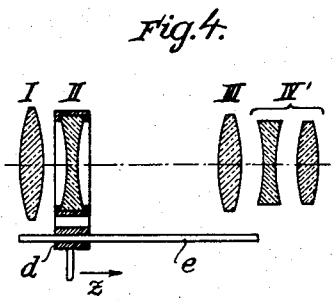
Fig. 4 illustrates a mounting for the movable component of the varifocal group of Figs. 1 and 2.

The four limiting values $f_1'$, $f_1''$, $f_2'$ and $f_2''$ of the overall focal length of the system are respectively obtained in the two illustrated extreme positions of component II in the combination of Fig. 1 and in the corresponding positions thereof in the arrangement of Fig. 2. Fig. 3 illustrates how a support $c$, slidable between guide rails $c'$, carries the two lens groups IV', IV" so that either of them is alignable with the varifocal group I–III by lateral displacement as indicated by the arrow $x$. Fig. 4 shows the movement of adjustable component II in axial direction $z$ by means of a support $d$ slidable on one or more rails $e$.

Figure 5:
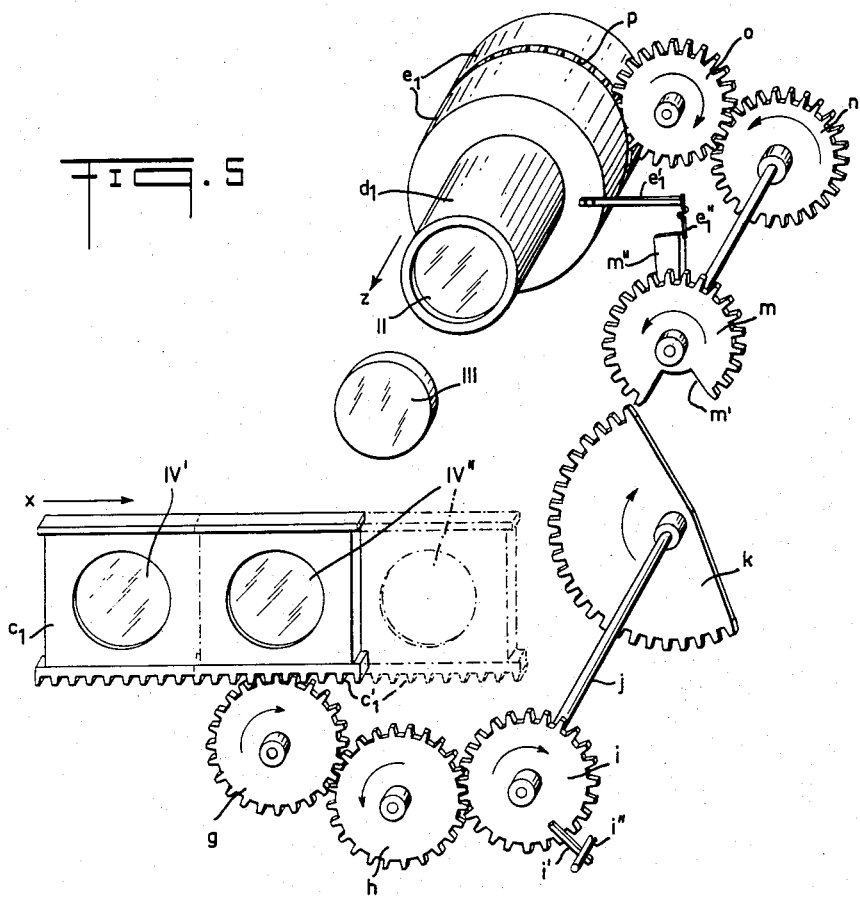
Fig. 5 is a perspective ivew of a mechanism for coordinating the movements depicted in Figs. 3 and 4.

It is desirable that the movements just described be coordinated so that separate manual movement of both supports $c$ and $d$ becomes unnecessary when passing from one varifocal zone to the other. A mechanism suitable for this purpose is shown in Fig. 5 where the support $c_1$ for lens groups IV', IV" is provided with rack teeth $c_1'$ meshing with a gear train $g$, $h$, $i$, controlling, via a shaft $j$, the position of a sector gear $k$. Gear $i$ carries a lug $i'$ which cooperates with a stop $i''$ to limit rotation of the shaft $j$ to slightly less than a full revolution, the transmission ratio between shaft $j$ and slider $c$ being so selected that either lens group IV', IV" will be aligned with the varifocal group I–III in the two limiting positions of the shaft. A second sector gear $m$, positioned for engagement with sector gear $k$, has a gap $m'$ which prevents its entrainment by the latter gear after it has reached either of two limiting positions. Sector gear $m$ is coupled with a gear train $n$, $o$ with a toothed ring $p$ on a mount $e_1$ wherein the support $d_1$ of varifocal component II is axially slidable under the control of ring $p$.

The mounting $e_1$ carries a stud $e_1'$ from which a spring arm $e_1''$ projects into the path of a lug $m''$ rigid with sector gear $m$. When a tooth on sector gear $k$ has reached the gap $m'$ of sector gear $m$, it pushes gear $m$ beyond its limiting position against the force of spring $e_1''$ so that shaft $j$ can continue to rotate until gear $k$ has moved out of the orbit or gear $m$. When this is done, the spring $e_1''$ returns gear $m$ to a position in which it will be positively entrained by gear $k$ upon the return movement of the latter. As long as gear $k$ is in one of its extreme positions, however, setting ring $p$ can be freely rotated to displace the movable component II at will between the limits of its travel. Thus, movement of the slider $c_1$ will serve to interchange the lens groups IV′ and IV″ and at the same time to displace the lens II from one extreme position (or from an intermediate position) into the other extreme position, thereby insuring continuity in the transition from one zone of the varifocal range to the other.

Figure 6:
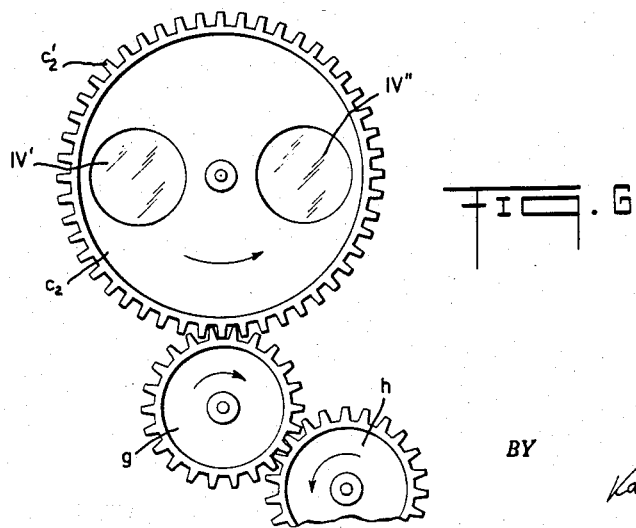
Fig. 6 shows a partial modification of the mechanism of Fig. 5.

In the modification of Fig. 6 the slider $c_1$ has been replaced by a turret $c_2$ serving as a support for the lens groups IV′, IV″ and carrying gear teeth $c_2''$ in mesh with gear $g$. The interchange of the lens groups is here effected by a rotation of turret $c_2$ through an angle of 180°. Other, equivalent types of coupling are, of course, possible.

I claim:
1. In a varifocal objective system, in combination, a varifocal lens group, a principal objective comprising a first and a second lens group of fixed focal lengths interchangeably positionable between said varifocal group and an image plane, the fixed focal lengths of said first and second lens groups having a ratio of $1:\sqrt{n}$, said varifocal group being adjustable throughout a range of different overall focal lengths limited by the values

$$f\sqrt{1/n} \text{ and } f\sqrt[4]{n}$$

where $f$ is the local length of the lens group of said principal objective aligned therewith, whereby the overall focal length of the system is continuously variable between two extreme values whose ratio is equal to $n$, operating means for adjusting said varifocal group within said range, and stop means for arresting said operating means at the limits of said range.

2. The combination according to claim 1, wherein said ratio $n$ is substantially greater than 1:3.

3. The combination according to claim 1, wherein said varifocal group comprises two fixed components and a movable component intermediate said fixed components, said movable component being of a refractivity opposite to that of said fixed components.

4. The combination according to claim 1, further comprising mechanism for so interchanging said first and second lens groups that the distance between said image plane and the forward vertex of the foremost component of each of said interchangeable groups in a position of alignment with said varifocal group is substantially the same.

5. The combination according to claim 1, wherein said varifocal group comprises a component displaceable between two limiting positions, further comprising first control means for moving said component from one to the other of said limiting positions, second control means for interchanging said first and second lens groups, and coupling means for maintaining a substantially constant overall focal length of the system during operation of said first control means by coordinating the latter operation with an operation of said second control means.

6. A varifocal objective system comprising a varifocal lens group, a principal objective comprising two interchangeable groups of fixed focal lengths selectively alignable with said varifocal group, and mechanism for so positioning either of said interchangeable lens groups between said varifocal group and an image plane that the distance between said plane and the forward vertex of the foremost component of each of said interchangeable groups in a position of alignment with said varifocal group is substantially the same, said varifocal group comprising a component movable between two limiting positions, the ratio of said fixed focal lengths and the ratio of the overall focal lengths obtainable in said limiting positions with either of said interchangeable groups alone being $\sqrt{n}$ where $n$ is the total varifocal ratio of the system.

7. A varifocal objective system according to claim 6, further comprising coupling means for displacing said movable component from one to the other of its limiting positions and simultaneously interchanging said lens groups of fixed focal lengths.

References Cited in the file of this patent

UNITED STATES PATENTS

| | | |
|---|---|---|
| 494,128 | Decker | Mar. 28, 1893 |
| 696,788 | Allen | Apr. 1, 1902 |
| 1,174,547 | Clason | Mar. 7, 1916 |
| 1,354,583 | Skerrett | Oct. 5, 1920 |
| 1,372,645 | Cooper | Mar. 22, 1921 |
| 2,165,341 | Capstaff et al. | July 11, 1939 |
| 2,313,639 | Hauser | Mar. 9, 1943 |
| 2,552,940 | Cornut | May 15, 1951 |
| 2,649,025 | Cook | Aug. 18, 1953 |

FOREIGN PATENTS

| | | |
|---|---|---|
| 597,354 | Germany | May 25, 1934 |